United States Patent
Kwak

(10) Patent No.: US 8,130,829 B2
(45) Date of Patent: Mar. 6, 2012

(54) METHOD OF ENCODING MOVING PICTURE IN MOBILE TERMINAL AND MOBILE TERMINAL FOR EXECUTING THE METHOD

(75) Inventor: Kyoung Shik Kwak, Seoul (KR)

(73) Assignee: Pantech Co., Ltd., Seoul (KR)

( * ) Notice: Subject to any disclaimer, the term of this patent is extended or adjusted under 35 U.S.C. 154(b) by 1623 days.

(21) Appl. No.: 11/493,189

(22) Filed: Jul. 26, 2006

(65) Prior Publication Data

US 2007/0147499 A1 Jun. 28, 2007

(30) Foreign Application Priority Data

Dec. 28, 2005 (KR) .................. 10-2005-0131453

(51) Int. Cl.
*H04N 7/12* (2006.01)
*G06K 9/46* (2006.01)

(52) U.S. Cl. .................... 375/240.08; 382/190
(58) Field of Classification Search ............. 375/240.08; 382/190

See application file for complete search history.

(56) References Cited

U.S. PATENT DOCUMENTS

2004/0170326 A1* 9/2004 Kataoka et al. ............ 382/209
2006/0165291 A1* 7/2006 Atsumi et al. ............. 382/190

FOREIGN PATENT DOCUMENTS

| KR | 1020040052142 | 6/2004 |
| KR | 1020050099350 | 10/2005 |
| KR | 1020060013085 | 2/2006 |

* cited by examiner

*Primary Examiner* — Jay Patel
*Assistant Examiner* — Richard Torrente
(74) *Attorney, Agent, or Firm* — H.C. Park & Associates, PLC

(57) ABSTRACT

A method of encoding a moving picture of a mobile terminal by receiving a target object and encoding information including effect information to be applied to the target object from a user, and by applying the encoding information, and the mobile terminal using the method. Specifically, the method of encoding the moving picture of the mobile terminal including: receiving a target object and encoding information including effect information to be applied to the target object from a user; receiving a selection from a user with respect to whether to apply the encoding information when encoding the moving picture; and encoding the moving picture by applying the encoding information when the user selects to apply the encoding information.

11 Claims, 4 Drawing Sheets

METHOD OF ENCODING MOVING PICTURE IN MOBILE TERMINAL AND MOBILE TERMINAL FOR EXECUTING THE METHOD

CROSS-REFERENCE TO RELATED APPLICATION

This application claims priority from and the benefit under 35 U.S.C. §119(a) of Korean Patent Application No. 10-2006-0131453, filed on Dec. 28, 2005, in the Korean Intellectual Property Office, which is incorporated by reference for all purposes as if fully set forth herein.

BACKGROUND OF THE INVENTION

1. Field of the Invention

The present invention relates to a method of encoding a moving picture in a mobile terminal, and more particularly, to a method of encoding a moving picture by receiving a target object and encoding information including effect information to be applied to the target object from a user, and by applying the encoding information, and the mobile terminal using the method.

2. Description of Related Art

Since convenience of a mobile terminal is widely well-known, usage of mobile terminals has greatly increased, and an increasing number of service providers are providing users with many more services for the mobile terminals. Also, in the mobile terminals, various functions are added, such as a function of a digital camera, an MP3 player and a camcorder, so that users become able to utilize various functions with only the mobile terminal, and not requiring other devices.

In a conventional mobile terminal using a conventional technique, only image resolution control or image size control is possible while recording a moving picture, moreover, with respect to a function of an effect, i.e. brightness, white balance or the like, a method of identically encoding all frames is utilized while recording the moving picture. Namely, an entire moving picture is encoded with only one effect, so that the entire moving picture is formed in an identical effect.

As users' need increase in complexity, the users may not be satisfied with the conventional mobile terminal using the conventional technique, e.g. when the users desire to make a background darker than a target object, to make the target object brighter than the background, or to bring out the target object from the background, the method of encoding the moving picture in the conventional mobile terminal using the conventional technique may not satisfy the users' complex needs.

Consequently, various functions for providing a method of encoding a moving picture of a mobile terminal are required to satisfy the users' complex needs.

BRIEF SUMMARY

The present invention provides a method of encoding a moving picture of a mobile terminal which can establish a different effect to an individual object of the moving picture by applying effect information to a target object when encoding the moving picture, and the mobile terminal using the method.

The present invention also provides a method of encoding a moving picture in a mobile terminal which can meet users' need for encoding the moving picture by receiving a target object and encoding information, including effect information, to apply to the target object from a user and encoding the moving picture by applying the encoding information, and the mobile terminal using the method.

The present invention also provides a method of encoding a moving picture in a mobile terminal which can variously encode each individual frame of a moving picture since, when an object of one frame is extracted from a moving picture and the object is identical to a target object, the object is encoded by applying the effect information, and the mobile terminal using the method.

The present invention also provides a method of encoding a moving picture of a mobile terminal which can variously encode the moving picture by receiving related information of encoding the moving picture from a user in advance, and selectively apply effect information to an object selected by a user in contrast to a conventional method of identically encoding all frames of the moving picture, and the mobile terminal using the method.

According to an aspect of the present invention, there is provided a method of encoding a moving picture of a mobile terminal, the method including: receiving a target object and encoding information including effect information to be applied to the target object from a user; receiving a selection from a user with respect to whether to apply the encoding information when encoding the moving picture; and encoding the moving picture by applying the encoding information when the user selects to apply the encoding information.

According to another aspect of the present invention, there is provided a mobile terminal encoding a moving picture, the mobile terminal including: an encoding information input unit receiving a target object and encoding information including effect information to be applied to the target object from a user; an encoding information application unit receiving a selection from a user with respect to whether to apply the encoding information when encoding the moving picture; and a moving picture encoding unit encoding the moving picture by applying the encoding information when the user selects to apply the encoding information

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
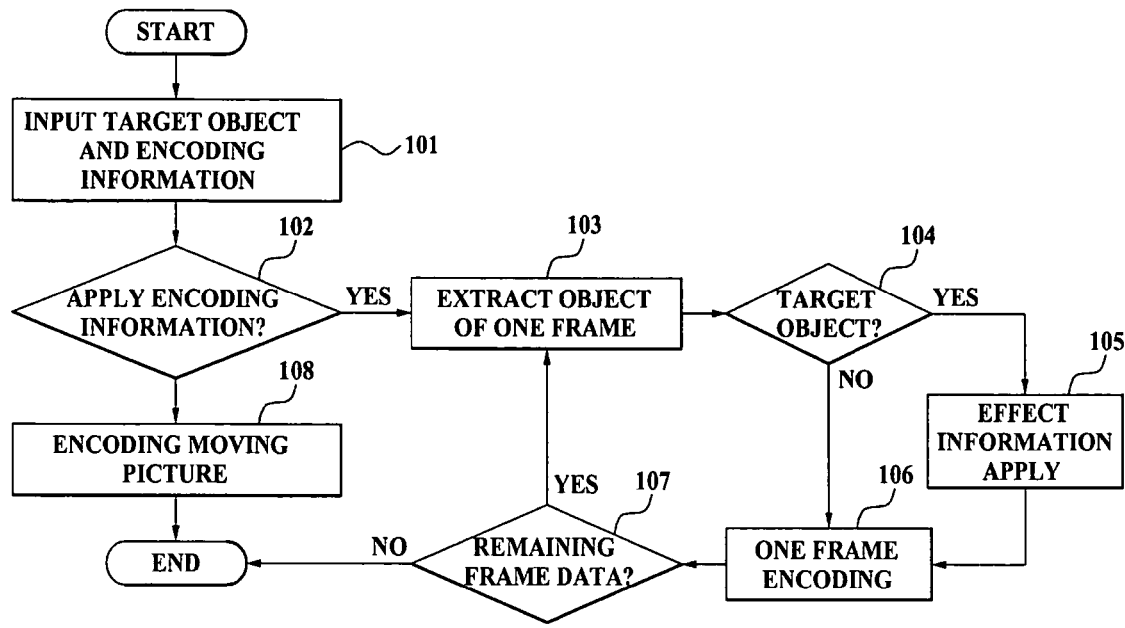
FIG. 1 is a flowchart illustrating a method of encoding a moving picture in a mobile terminal according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a flowchart illustrating a method of encoding a moving picture in a mobile terminal according to an embodiment of the present invention.

In operation 101, the mobile terminal receives a target object and encoding information including effect information to apply to the target object. The mobile terminal receives the encoding information through a predetermined option menu before encoding the moving picture.

The target object may indicate either an object of one person or one pattern by gathering multiple patterns. Namely, the target object may indicate a type of a pattern, e.g. a circle, a square, and the like. The effect information is what establishes a certain effect to the target object, and is only applicable to the target object that is a different person or in a different pattern from the target object, i.e. the effect information may indicate establishing a background as the target object and brightening or darkening only the background in a moving picture.

In operation 102, the mobile terminal receives the user's selection with respect to whether the encoding information is applied when encoding the moving picture. The user may select either only the target object, or an entire moving picture as the target object. The target object may be a type of a target object to which the effect information is applied in the moving picture when encoding the moving picture. The mobile terminal receives the user's selection with respect to whether the encoding information is applied when encoding the moving picture through a predetermined option menu either while recording the moving picture, or before encoding the moving picture.

According to an embodiment of the present invention, the method of encoding the moving picture in the mobile terminal which can establish a different effect to an individual object of the moving picture by applying effect information to the target object when encoding the moving picture, is provided.

According to the embodiment of the present invention, in operation 108, a moving picture is conventionally encoded regardless of the encoding information, when the user selects not to apply the encoding information.

When the user selects to apply the encoding information, in operation 103, the mobile terminal extracts an object of one frame. According to the embodiment of the present invention, the moving picture may consist of a plurality of frames. Thus, effect information may be applied to the individual object of each individual frame by dividing the moving picture into the each individual frame. The object of the frame may indicate an object of a first frame after dividing the moving picture into a plurality of frames.

In operation 104, the mobile terminal determines whether the extracted object is identical to the target object by recognizing a property or additional information of the extracted object. The property or additional information of the extracted object may be recognized by an association with the target object specified by the user.

When the extracted object is identical to the target object, in operation 105, the mobile terminal encodes the one frame by applying the effect information when the extracted object is identical to the target object. On the other hand, when the extracted object is not the target object, in operation 106, the mobile terminal encodes the one frame in a conventional method regardless of the effect information.

In operation 107, the mobile terminal confirms whether any remaining frame data exist or not. When remaining frame data exists, the mobile terminal repeatedly executes the operation 103 through 106. When no remaining frame data exists, the mobile terminal ends the encoding of the moving picture.

Figure 2:
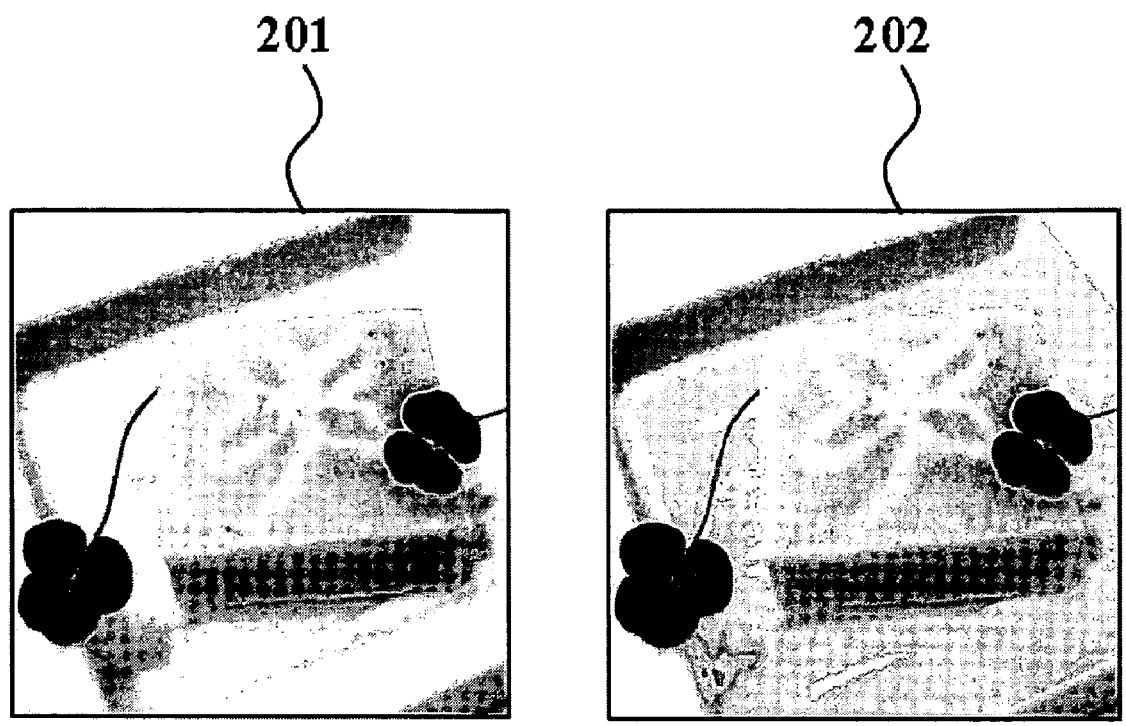
FIG. 2 is a diagram illustrating an encoded image of the moving picture in a mobile terminal according to an embodiment of the present invention.

FIG. 2 is a diagram illustrating an encoded image of a moving picture in a mobile terminal according to an embodiment of the present invention.

As illustrated in FIG. 2, an illustration 201 may be the encoded image illustrating an extracted object of one frame when encoding a moving picture. The user may establish all of the extracted object as a target object.

In another illustration 202, the mobile terminal may apply effect information to the object by determining the object as a target object. The effect information may a color purple, accordingly the mobile terminal colors the object purple.

Figure 3:
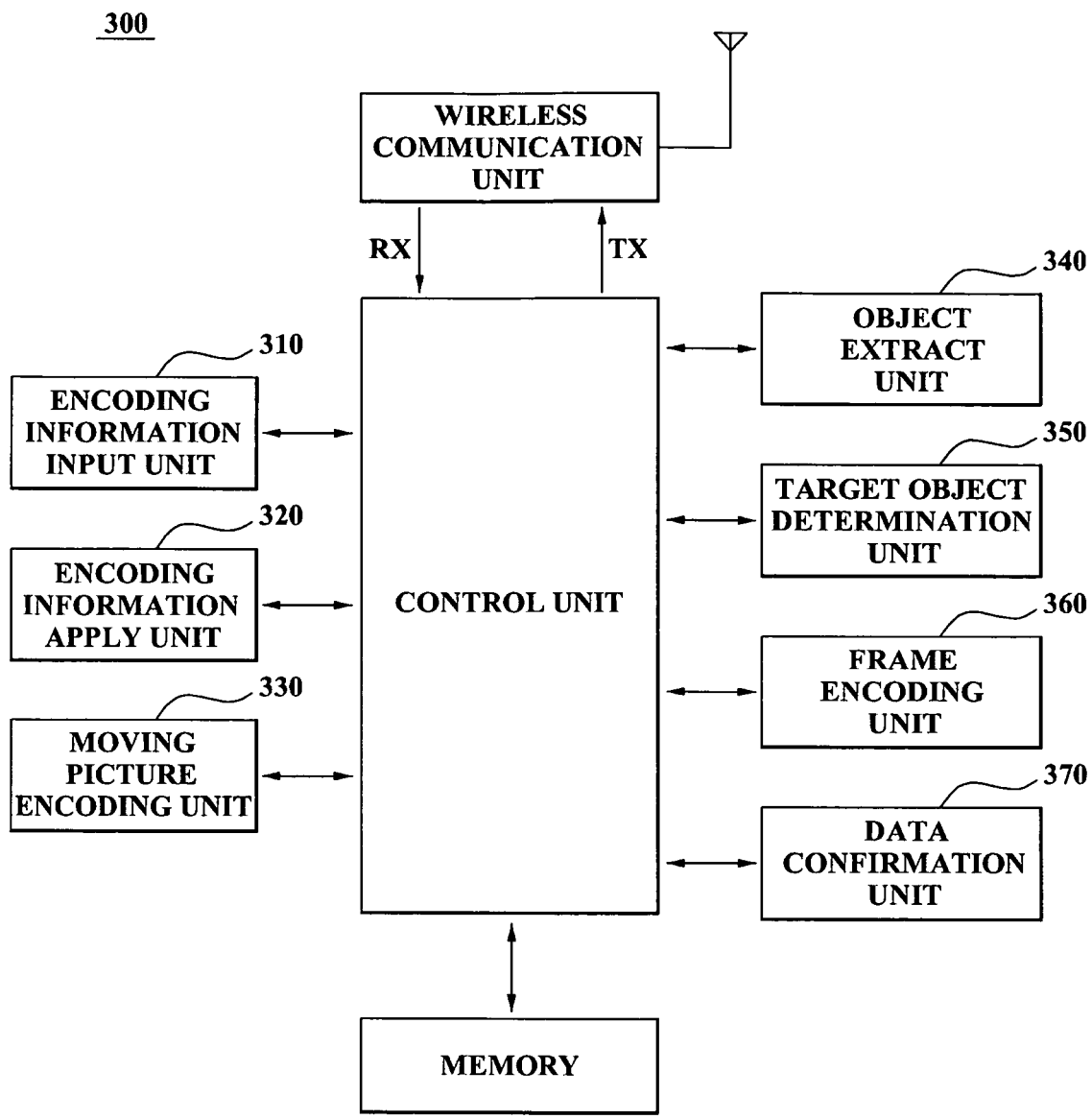
FIG. 3 is a block diagram illustrating a configuration of a mobile terminal encoding the moving picture according to an embodiment of the present invention.

FIG. 3 is a block diagram illustrating a configuration of a mobile terminal encoding a moving picture according to an embodiment of the present invention. The mobile terminal 300 includes an encoding information input unit 310, an encoding information apply unit 320, a moving picture encoding unit 330, an object extract unit 340, a target object determination unit 350, a frame encoding unit 360, and a data confirmation unit 370.

The encoding information input unit 310 receives a target object and encoding information including effect information to apply to the target object from a user. The target object may indicate either one person object or one pattern by gathering multiple patterns. The effect information is what establishes a certain effect to be applied to the target object, and is only applicable to the target object in a different form from another object.

The encoding information apply unit 320 receives the user's selection with respect to whether the encoding information is applied when encoding the moving picture. The encoding information apply unit 320 is executed either while recording the moving picture or through a predetermined option menu before encoding the moving picture.

The moving picture encoding unit 330 may conventionally encode the moving picture regardless of the encoding information, when the user selects to not apply the encoding information.

On the other hand, when the user selects to apply encoding information, the moving picture encoding unit 330 encodes the moving picture by applying the encoding information. In this case, the object extract unit 340 extracts an object in one frame. The object of the one frame may indicate an object of a first frame after dividing the moving picture into a plurality of frames.

The target object determination unit 350 determines whether the extracted object is identical to the target object by recognizing a property or additional information of the extracted object. The target object determination unit 350 determines whether the property or additional information of the extracted object has been recognized by an association with the target object specified by the user.

The frame encoding unit 360 encodes the one frame by applying the effect information when the extracted object is identical to the target object. However, when the extracted object is not identical to the target object, the frame encoding unit 360 encodes the one frame in a conventional method regardless of the effect information The data confirmation unit 370 confirms whether any remaining frame data exists or not. When the remaining frame data exist, the frame encoding unit 360 repeatedly executes the encoding for the remaining frame data. When no remaining frame data exist, the data confirmation unit 370 terminates the encoding of for the frame data.

Figure 4:
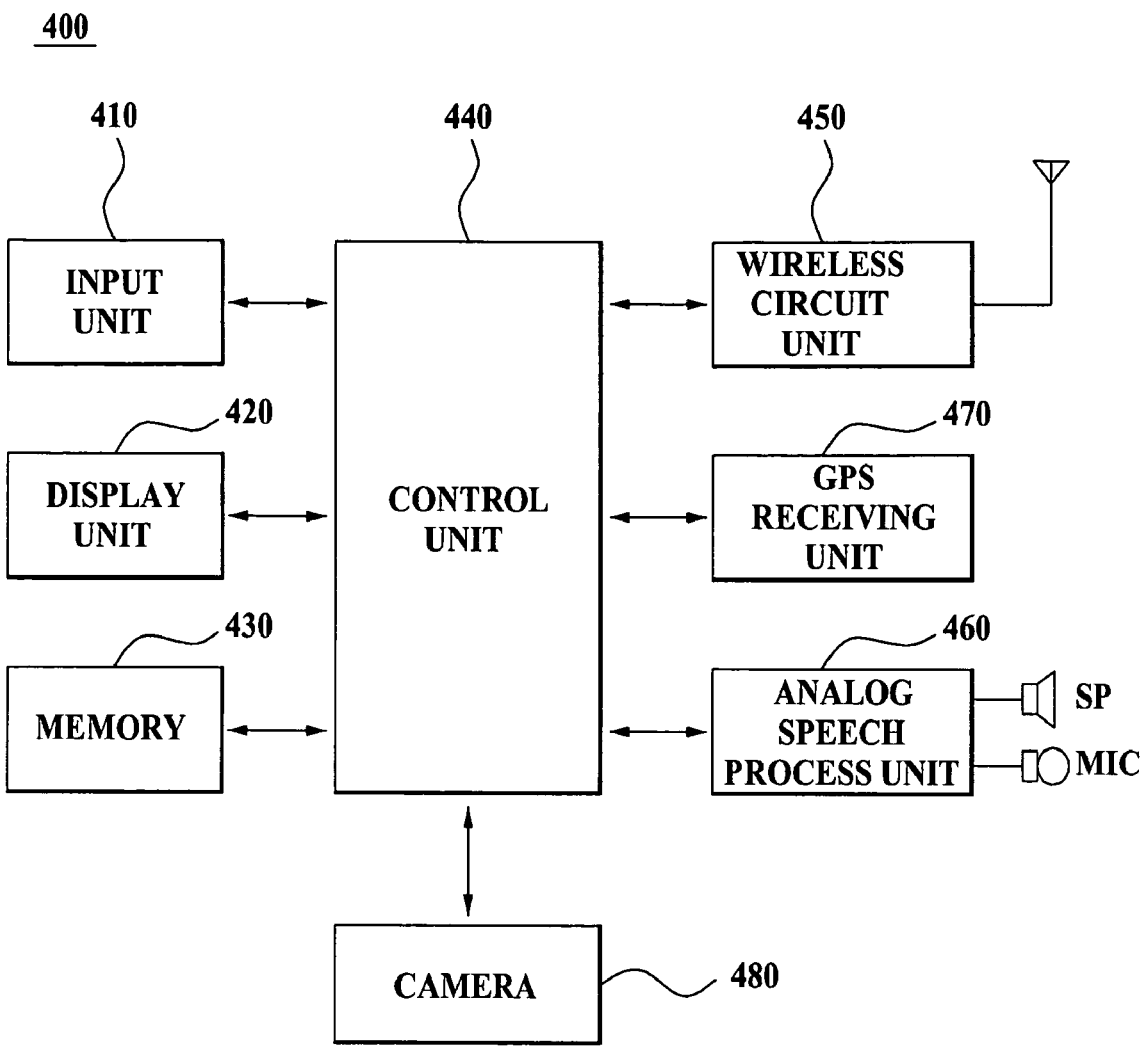
FIG. 4 is a block diagram illustrating a configuration of a mobile terminal encoding a moving picture according to another embodiment of the present invention.

FIG. 4 is a block diagram illustrating a configuration of a mobile terminal encoding a moving picture according to another embodiment of the present invention.

The mobile terminal 400 includes an input unit 410, a display unit 420, a memory 430, a control unit 440, a wireless circuit unit 450, an analog speech process unit 460, a GPS receiving unit 470 and a camera 480.

The input unit 410 receives a specific object when receiving object information to establish an effect for a moving picture. The input unit 410 may consists of a keypad, a jog shuttle, and the like.

The display unit 420 may display a frame in which an effect has been established for the specific object when recording.

The memory 430 is what has stored data to process each individual frame while recording the moving picture, and may transfer the stored data to the display unit 420 by communicating with the control unit 440 at a specific point. The stored data may be what includes the specific effect information to the object selected by a user. Recorded data may exist in a proper location of the memory 430.

The camera 480 transfers a number of proper frames per second to a digital signal processor (DSP) of the control unit 440 by communicating with the control unit 440. In this case, the camera 480 collects a raw data as seen with naked eyes, so that the camera 480 may collect data before an effect is established.

The control unit 440 may be a processor properly processing all data in a mobile terminal associated with the DSP, i.e. a general modem, also may be a baseband signal processing circuit to process the baseband signal from the wireless circuit unit 450. The control unit 440 returns finally desired data in the memory 430, on a basis of information received from the user with the data.

When a sound is received through a microphone (MIC) while storing the moving picture, the analog speech processing unit 460 transfers the sound to the control unit 420 by transforming the sound to a digital signal.

The MIC collects speech information of the moving picture when recording, so that the speech information may be added to the moving picture to be recorded.

A mobile terminal as used in the present specification includes mobile communication devices, such as a Personal Digital Cellular (PDC) phone, a personal communication service (PCS) phone, a personal handyphone system (PHS) phone, a Code Division Multiple Access (CDMA)-2000 (1×, 3×) phone, a Wideband CDMA phone, a dual band/dual mode phone, a Global System for Mobile Communications (GSM) phone, a mobile broadband system (MBS) phone, a Digital Multimedia Broadcasting (DMB) phone, and a cellular phone; portable terminals such as a personal digital assistant (PDA), a hand-held PC, a notebook PC, a wireless broadband Internet (WiBro) terminal, and an MP3 player; and all types of hand-held based wireless communication devices including an International Mobile Telecommunication (IMT)-2000system providing international roaming service and extended mobile communication service. Also, the portable device may include a predetermined communication module such as a CDMA module, a Bluetooth module, an Infrared Data Association (IrDA) module, a wired/wireless LAN card, and a wireless communication device which is provided with a global positioning system (GPS) chip enabling tracking of a position via a GPS. Also, the portable device may include a microprocessor which can play multimedia and perform a certain calculation operation.

The method of encoding a moving picture according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, by receiving a target object and encoding information including effect information to be applied to the target object from a user, and by applying the encoding information, users' needs for a moving picture can be satisfied.

Also, according to the present invention, there is provided method of encoding a moving picture in a mobile terminal which can variously encode each individual frame of a moving picture since, when an object of one frame is extracted from a moving picture, and the object is identical to a target object, the object is encoded by applying the effect information, and the mobile terminal using the method.

Also, according to the present invention, there is provided a method of encoding a moving picture of a mobile terminal which can variously encode the moving picture by receiving related information of encoding a moving picture from a user in advance and selectively applying effect information to an object selected by a user in contrast to a conventional method of identically encoding all frames of the moving picture, and the mobile terminal using the method.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of encoding a moving picture in a mobile terminal, the method comprising:
   receiving a target object and encoding information including effect information to be applied to the target object from a user;
   receiving a selection from a user with respect to whether to apply the encoding information when encoding the moving picture; and
   encoding the moving picture by applying the encoding information when the user selects to apply the encoding information,
   wherein the encoding the moving picture further comprises:
       extracting an object from one frame;
       determining whether the extracted object is identical to the target object by recognizing a property or additional information of the extracted object;
       encoding the one frame by applying the effect information when the extracted object is identical to the target object; and if the user selects to apply the encoding information, encoding the one frame without applying the effect information if the extracted object is not identical to the target object.

2. The method of claim 1, wherein the encoding information is received through a predetermined option menu before encoding the moving picture.

3. The method of claim 1, further comprising:
executing general encoding of a moving picture without applying the encoding information, when the user selects not to apply the encoding information.

4. The method of claim 1, wherein the receiving of the user's selection is executed while recording the moving picture or through a predetermined option menu before encoding the moving picture.

5. The method of claim 1, further comprising:
determining whether any remaining frame data exist; and
repeatedly executing the encoding of the moving picture when the remaining frame data exist.

6. The method of claim 5, further comprising:
terminating the encoding of the moving picture when no remaining frame data exist.

7. A non-transitory computer-readable recording medium storing a program for implementing a method of encoding a moving picture in a mobile terminal, the method comprising:
receiving a target object and encoding information including effect information to be applied to the target object from a user;
receiving the user's selection with respect to whether to apply the encoding information when encoding the moving picture; and
encoding the moving picture by applying the encoding information when the user selects to apply the encoding information,
wherein the encoding the moving picture further comprises:
extracting an object from one frame;
determining whether the extracted object is identical to the target object by recognizing a property or additional information of the extracted object;
encoding the one frame by applying the effect information when the extracted object is identical to the target object; and
if the user selects to apply the encoding information, encoding the one frame without applying the effect information if the extracted object is not identical to the target object.

8. A mobile terminal to encode a moving picture, the mobile terminal comprising:
an encoding information input unit to receive a target object and to encode information including effect information to be applied to the target object from a user;
an encoding information application unit to receive a selection from a user with respect to whether to apply the encoding information when encoding the moving picture;
a moving picture encoding unit to encode the moving picture by applying the encoding information when the user selects to apply the encoding information;
an object extraction unit to extract an object from one frame;
a target object determination unit to determine whether the extracted object is identical to the target object by recognizing a property or additional information of the extracted object; and
a frame encoding unit to encode the one frame by applying the effect information when the extracted object is identical to the target object,
wherein if the user selects to apply the encoding information, the frame encoding unit encodes the one frame without applying the effect information if the extracted object is not identical to the target object.

9. The mobile terminal of claim 8, wherein the moving picture encoding unit executes general encoding of a moving picture without applying the encoding information when the user selects not to apply the encoding information.

10. The mobile terminal of claim 8, wherein the encoding information application unit receives the selection through a predetermined option menu while recording the moving picture or before encoding the moving picture.

11. The mobile terminal of claim 8, further comprising:
a data confirmation unit to confirm whether frame data remains or not; and
wherein the frame encoding unit repeatedly executes the encoding of the moving picture when the frame data remain.

* * * * *